United States Patent [19]

Fukushima et al.

[11] 4,008,095

[45] Feb. 15, 1977

[54] PAVING COMPOSITIONS AND METHOD FOR PRODUCING THE SAME

[75] Inventors: Fumiaki Fukushima, Tokyo; Hiroshi Nozaki, Chiba; Keisuke Tanaka; Takashi Kanagawa, both of Tokyo, all of Japan

[73] Assignee: Nichireki Kagaku Kogyo Co., Ltd., Tokyo, Japan

[22] Filed: Dec. 9, 1974

[21] Appl. No.: 531,181

Related U.S. Application Data

[63] Continuation of Ser. No. 374,543, June 28, 1973, abandoned, which is a continuation of Ser. No. 278,854, Aug. 8, 1972, abandoned, which is a continuation of Ser. No. 18,498, March 11, 1970, abandoned.

[30] Foreign Application Priority Data

Mar. 12, 1969 Japan .............. 44-18306

[52] U.S. Cl. .............. 106/235; 106/248; 106/253; 106/264; 106/269; 106/280; 106/281 R; 106/284; 260/28.5 AS; 260/733; 260/745; 260/758

[51] Int. Cl.² .............. C08L 7/00; C08L 91/00; C08L 93/00; C08L 95/00

[58] Field of Search .......... 106/235, 248, 253, 264, 106/269, 280, 281 R, 284; 260/28.5 AS, 733, 745, 758

[56] References Cited

UNITED STATES PATENTS

| | | | |
|---|---|---|---|
| 2,037,147 | 4/1936 | Radcliffe | 106/281 |
| 2,113,794 | 4/1938 | Léauté | 106/284 |
| 2,188,204 | 1/1943 | Marr et al. | 106/279 X |
| 2,629,669 | 2/1953 | Anderton | 106/280 X |
| 2,701,217 | 2/1955 | Fair, Jr. | 106/280 X |
| 2,877,128 | 3/1959 | Hardman | 106/279 |
| 2,888,357 | 5/1959 | Pittman et al. | 106/280 X |
| 3,085,892 | 4/1963 | White et al. | 106/278 |
| 3,091,543 | 5/1963 | Rhodes et al. | 106/279 |
| 3,243,311 | 3/1966 | Rogers et al. | 106/280 |
| 3,264,127 | 8/1966 | Conley | 106/281 R |

*Primary Examiner*—Murray Tillman
*Assistant Examiner*—Joan E. Welcome
*Attorney, Agent, or Firm*—Woodhams, Blanchard and Flynn

[57] ABSTRACT

A paving composition comprising asphalt and micro-granular coal which are uniformly combined integrally with each other without thermal decomposition of said coal and a method for producing a paving composition which comprises triturating a mixture of asphalt and coal at a temperature below the thermal decomposition point of the coal thereby to reduce the diameter of the resulting micro-granular coal to 1 to 100$\mu$ and, at the same time, to achieve the uniform integral combination of asphalt and coal. Thereby, there is provided a paving composition which is excellent in thermal stability, weather resistance, adhesive property, sticking strength, viscoelasticity and workability. Moreover, besides the main components, asphalt and coal, various modifying agents or additives may be further incorporated so that the properties of the paving composition can be further improved.

16 Claims, 1 Drawing Figure

PAVING COMPOSITIONS AND METHOD FOR PRODUCING THE SAME

This is a continuation of co-pending application Ser. No. 374,543, filed June 28, 1973, now abandoned, which application is a continuation of prior application Ser. No. 278,854, filed Aug. 8, 1972, now abandoned, which application in turn is a continuation of prior application Ser. No. 18,498, filed Mar. 11, 1970, now abandoned.

This invention relates to paving compositions and a method for producing the same. More particularly, this invention relates to paving compositions comprising asphalt and micro-granular coal which are uniformly combined integrally with each other without thermal decomposition of the coal, and a method for producing the same.

Heretofore, there have been various bitumen paving compositions or mixes which include asphalt, cutback asphalt, tar or mixtures of asphalt and tar. Besides them, there has also been proposed a so-called "Bōjuntan" which is produced by mixing coal tar with coal powder followed by heating a temperature above the thermal decomposition point of coal (e.g. 250° to 350° C.) under a high pressure (e.g. 30 atm.) for a relatively long time (e.g. 4 to 6 hours) thereby to thermally decompose some of the coal and, at the same time, to dissolve the coal in the coal tar. However, the conventional bitumen paving compositions have the disadvantage that they are insufficient in properties and resistances necessary as material for pavement, such as weather resistance, thermal resistance, freezing resistance, flashing resistance, adhesive property, sticking strength and the like. Moreover, as to the "Bōjuntan", the processing conditions are severe and, therefore, the practical use of such composite paving material has been restricted.

As a result of an intensive study by the present inventers, it has been found that the uniform integral mixture of asphalt, micro-granular coal and/or other suitable modifying agent, which is produced by mixing and/or grinding at a temperature below the thermal decomposition point of coal, has excellent properties as a material for pavement, as compared with the conventional bitumen paving material. The present invention has been made on the basis of such novel finding.

Therefore it is an object of the present invention to provide a paving composition which comprises asphalt and micro-granular coal, said asphalt and micro-granular coal being uniformly combined integrally with each other without thermal decomposition of the coal, and which is extremely excellent in properties necessary as a material for pavement.

It is another object of the present invention to provide a paving composition of this kind, in which other suitable modifying agent is further incorporated.

It is a further object of the present invention to provide a paving composition of the kind as described which can be manufactured and sold at reasonable cost.

It is a still further object of the present invention to provide a method of producing the paving composition as described above which is simple and extremely suitable for practical operation.

The foregoing and other objects, features and advantages of the present invention will be easily understood from the following description and the accompanying drawing in which:

There is shown a vertical sectional view of the trituration type continuous grinder which is preferably used for producing a paving composition according to the present invention.

The gist of the present invention resides in that, without subjecting coal to thermal decomposition, the original specific properties of coal is effectively utilized to form a uniform integral mixture of coal with asphalt. In order to realize the instant invention, there is preferably employed a method in which a mixture of asphalt and coal is ground or triturated, while further mixing said mixture, at a temperature below the thermal decomposition point of coal (about 200° C.). As the coal to be used in this invention, peat, lignite, brown coal, bituminous coal or the like may be employed along or in mixtures thereof. Coal is an organic substance which consists mainly of carbon, hydrogen and oxygen and includes small amounts of nitrogen and sulfur, and minute amounts of metals such as V, Ni, Co, Fe, Mg, Mn, Cu, Mo, Zn, Pb, Zr, Ge, etc. Furthermore, the coal is porous, and has in its intersurfaces various chemically active or functional groups such as carboxyl, carbonyl, phenolic hydroxyl methoxyl, etc. It is also known that coal has an ion-exchanging property. Accordingly, it is noted that as the diameter of the coal particles is reduced by the trituration or grinding, there appear more fresh surfaces with the chemically active groups in the nascent form, leading to an increase in the combining activity of coal. For this reason, when the mixture of asphalt and coal is triturated under the abovementioned temperature condition, the generated energy serves to effect physical and chemical changes such as mixing, dispersion and combination between the asphalt, coal and/or the additives or modifying agents if employed, thus providing a paving composition which is novel and extremely excellent in various properties such as thermal stability, adhesive property, sticking strength, viscoelasticity and workability. In this connection, it is to be noted that, according to the present invention, only by sufficiently mixing asphalt of the fluid form and micro-granular coal can the object of the present invention be achieved to some extent, but the further mixing and triturating process apparently has a good effect on the resulting paving composition.

With regard to asphalt which is used as a main component of the present paving composition, it is necessary for the asphalt to have a fluidity at a temperature below the thermal decomposition temperature of coal (about 200° C.) so that the asphalt can easily be wettingly mixed with coal. When the softening point of the asphalt is too high to have a sufficient fluidity at a temperature below about 200° C., a cut oil such as petroleum oil, coal oil or other suitable organic solvent is added in an appropriate amount to give the asphalt the required fluidity. In a still further aspect of the present invention, tar or a mixture of tar and asphalt may be employed in place of asphalt. Moreover, in order to obtain the desired modification of properties of the resulting paving composition, a crude oil such as a crude oil of naphthene base, paraffin base, mixed base or the like, a heavy mineral oil such as a heavy oil for fuel, mobile oil, turbine oil, diesel oil, machine oil or the like, a light mineral oil such as light oil, kerosene, petroleum naphtha or the like, or a petroleum pitch may be substituted for or added to asphalt.

As to the coal which is another component of the present paving composition, the diameter thereof in the final paving composition is preferably in the range of 1 to 100μ, more preferably 1 to 30μ. When coal is mixed with and dispersed in asphalt using a trituration type continuous grinder having triturating member made of Carborundum, Alundum, corundum, boron carbide, titanium carbide, tungsten carbide, molybdenum carbide or silicon nitride, most of the coal fed in can be pulverized to have a micro-granule diameter of less than 30μ. The amount of coal to be added varies depending on the use of the desired paving composition, but is preferably in the range of 3 to 50%, more preferably in the range of 10 to 30% by weight, based on the weight of the final paving composition. With a coal content of less than 3% by weight, a lesser effect can be observed, and with a coal content of more than 50% by weight, the workability of the product is deteriorated.

The paving composition according to the present invention shows properties different from those of the respective components of the composition. Especially when the present paving composition is produced in such manner that coal is mixed with and dispersed in asphalt by trituration, the change in the properties is noticeable: for example, the coal micro-granule dispersed in asphalt will scarcely sediment. The reason for this phenomenon is still not clear, but it is possibly due to the formation of a complicated composition in which asphalt and micro-granular coal are integrally combined with each other by the activity of coal as well as through the medium of hydrocarbons having relatively low molecular weights which are present in the asphalt and/or additives. This is presumed from the electron microscopic picture and the X-ray diffractometric picture.

In a still further aspect of the present invention, besides the main components, asphalt and coal, various modifying agents or additives may be additionally employed so that the properties of the final paving composition may be further improved and coal may easily be mixed with, dispersed in and combined with other materials including asphalt during the formation of the desired paving composition. Examples of such additives or modifying agents embrace tars such as coal tar, oil gas tar and tar pitch; pitches such as styrene tar pitch, fatty acid pitch and tall oil pitch; natural and synthetic rubbers such as butadiene-styrene rubber, butadiene-ac lonitrile rubber, chloroprene rubber, polyisobutylene rubber, polyisoprene rubber, polybutadiene rubber and butyl rubber; fats and oils such as bean oil, linseed oil, fish oil and whale oil; synthetic resins such as polyvinyl chloride, polyethylene, ethylene-vinyl acetate copolymer, ethylene-vinyl alcohol copolymer, polypropylene and propylene-ethylene copolymer; natural resins such as turpentine and rosin; petroleum resins; natural resin oils such as pine root oil and turpentine oil; coal oils such as creosote and anthracene; chlorine-containing organic solvents such as α-chloronaphthalone, tetrachloroethylene, trichloroethylene, methylene chloride, dichloropropane and carbon tetrachloride; tetrahydronaphthalone; and metallic soaps such as those of Ca, Mg, Zn, Al and Fe. The additives may be used alone or in mixtures thereof, so that the corresponding effects as mentioned hereunder can be obtained.

The tars and coal oils are effective as an agent for promoting the combination of asphalt with coal and also are effective for not only improving the self-hardening property, adhesive property and sticking strength of the resulting paving composition but also for preventing the flowage thereof. Moreover, they are remarkedly effective for improving the adhesive property of the present paving composition to natural aggregates such as water-wetted ground stone and pebbles, baked synthetic aggregates such as Synopearl and Luxobite (which are trade marks) and cement concretes. They are added preferably in an amount of 3 to 30% by weight, based on the weight of the final product.

The pitches are effective for preventing the paving composition from becoming brittle in cold weather. They are added preferably in an amount of 5 to 20% by weight, based on the weight of the final product.

The rubbers may be added in the form of a vulcanized or non-vulcanized ones. They are effective for imparting to the paving composition an extremely strong adhesive property, sticking strength, viscoelasticity, hot weather resistance, cold weather resistance, impact strength and wear resistance. The non-vulcanized rubbers are superior in imparting an adhesive property but are inferior in imparting the other properties, when compared to the vulcanized rubber one. They are added preferably in an amount of 0.5 to 5% by weight, based on the weight of the final product.

The fats and oils are effective not only for imparting a viscoelasticity to the paving composition but also, for preventing the paving composition from becoming brittle in cold weather. As compared with rubbers as well as the synthetic resins, the fats and oils have an advantage that the incorporation of them does not cause an elevation of the viscosity of the resulting paving composition. They are added preferably in an amount of 2 to 10% by weight, based on the weight of the final product.

The synthetic resins are capable of imparting substantially the same properties as the rubbers are. Yet, as compared with the rubbers, the synthetic resins are somewhat inferior in imparting an adhesive property but superior in imparting a hotness resistance, wear resistance and weather resistance and, at the same time, have an advantage that the incorporation thereof does not cause the elevation of the viscosity of the resulting paving composition. They are added preferably in an amount of 0.5 to 10% by weight, based on the weight of the final product. In case the rubbers and/or synthetic resins are added, if the above-mentioned chlorine-containing organic solvent, pine root oil, turpentine oil and tetrahydronaphthalene are further added alone or in mixtures thereof, the strong swelling and dissolving actions of the further added agents advantageously serve to incorporate the rubber and/or synthetic resins more uniformly in the paving composition.

The natural resins and petroleum resins are effective not only for improving the adhesive property but also for preventing the elevation of viscosity at high temperature of more than about 70° C. and the flowage at normal temperature. They are added preferably in an amount of 1 to 10% by weight, based on the weight of the final product.

The natural resin oils such as pine root oil and turpentine oil are, as stated hereinbefore, advantageously employed in combination with the rubbers and/or synthetic resins, whereby the rubbers and/or synthetic resins are softened, swollen and dissolved and then can be incorporated uniformly in the paving composition.

They are added preferably in amount of 1 to 10% by weight, based on the weight of the final product.

The coal oils such as creosote and anthracene are capable of well dissolving the petroleum and coal bitumens such as asphalt and tar and, therefore, are effective for lowering the viscosity of the paving composition. They are also effective for improving the adhesive property of the paving composition to the wetted aggregate. They are added preferably in an amount of 3 to 15% by weight, based on the weight of the final product.

The chlorine-containing organic solvents such as α-chloronaphthalene, tetrachloroethylene, dichloropropane, etc. are effective for swelling and dissolving coal, rubber and synthetic resin and for promoting the reaction for combining them. Also, they are effective for imparting to the bitumen employed as the raw material and the resulting paving composition a fire-proof property. They are added preferably in an amount of 1 to 30% by weight, based on the weight of the final product.

Tetrahydronaphthalene is effective in the same way as the above-mentioned chlorine-containing organic solvents. It is added preferably in an amount of 0.5 to 8% by weight, based on the weight of the final product.

The metallic soaps such as those of Ca, Mg, Zn, Al, Fe, etc., are effective for promoting self-hardening of the paving composition and are added preferably in an amount of 0.1 to 2% by weight, based on the weight of the final product.

Figure 1:
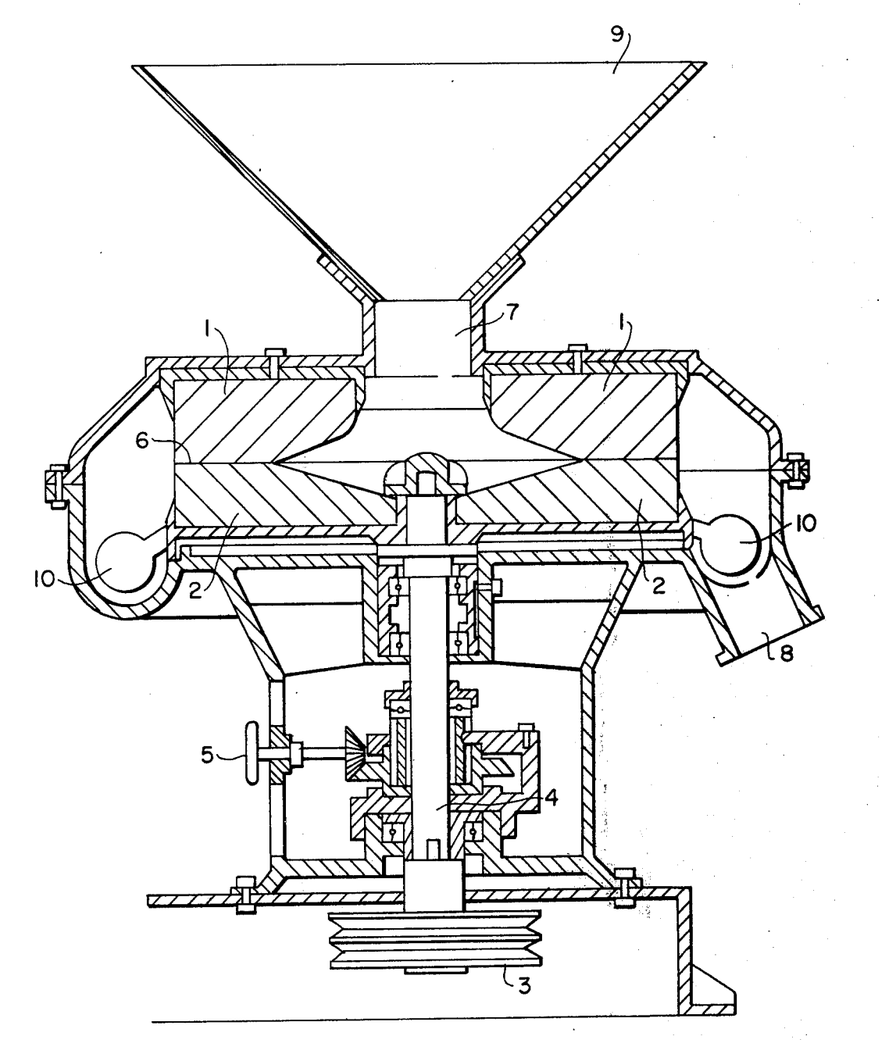

According to one embodiment of the present invention, the present paving composition is produced as follows: Asphalt is heated to make it fluid (if the asphalt is fluid at normal temperature, this heat treatment is omitted.). To the predetermined amount of fluid asphalt is added a given amount of coal which has been pulverised into powder or micro-granule form, followed by mixing. The resulting mixture is supplied to a suitable super grinder, for example a trituration type continuous grinder as shown in the accompanying drawing and then, further mixed, while pulverizing or triturating the coal to super micro-granules, to obtain the paving composition according to the present invention.

When the trituration type continuous grinder is used for finely grinding coal, heat will be occasionally generated during the course of trituration, which is yet allowable. However, as it is undesirable for the generated heat to cause the temperature to be elevated over about 200° C. at which coal will be thermally decomposed, careful attention should be paid so that the temperature is not elevated over 200° C. during the entire operation of mixing and triturating the coal. Though the mixing and triturating operation may be conducted in either a batch system or a continuous system, the continuous type operation is efficiently carried out with advantage. If a high efficiency continuous grinder is employed, the purpose can be achieved by one-time operation.

Especially when there is employed the trituration type continuous grinder as shown in the accompanying drawing which is provided with a quern or triturating member made of a hard abrasive material such as epoxy resin-bound silicon carbide, Alundum, boron carbide, titanium carbide, tungsten carbide, molybdenum carbide, silicon nitride or corundum, good results can be obtained.

Referring now to the drawing, numeral 1 designates an annular upper triturating member which is fixedly secured. Numeral 2 designates a lower triturating member having a surface which is streaked so as to effect the efficient trituration, and adapted to be rotated at a high speed by a pulley 3 through a shaft 4. The lower triturating member 2 can be vertically moved by the opertion of a handle 5 so that the width of gap 6 between the upper and lower triturating members 1 and 2 may be manually regulated during the operation. Numeral 7 is a supply port of materials and numeral 8 is a discharge port for a triturated product. Numeral 9 designates a hopper for receiving the feed materials. A pair of blades 10 for discharging a triturated product are symmetrically provided so that the lower triturating member can be well balanced to rotate smoothly.

In this embodiment of the present invention, a mixture of asphalt, coal and/or additive is caused to drop from the hopper 9 through the supply port 7 onto the lower triturating member 2 and then caused to fly about by centrifugal force. As it passes through the gap 6 between the upper end 2 lower triturating members 1 and, the mixture is triturated to form the desired uniform composition, which is raked up by the blades 10 and then discharged from the discharge port 8.

As described hereinbefore, coal is porous, and has in its intersurfaces various chemically active or functional groups such as carboxyl, carbonyl, phenolic hydroxyl, methoxyl, etc. It is also known that coal has an ion-exchanging property. According, it is noted that the smaller the diameter of the coal particles caused by trituration or grinding, there appear more fresh surfaces with the chemically active groups in the nascent form, leading to an increase by geometrical progression in the combining activity of coal. For this reason, when the coal is finely ground at a temperature below about 200° C, the micro-granular coal is combinedly dispersed in asphalt, thus providing the present paving composition which is novel and excellent in various properties such as thermal stability, adhesive property, sticking strength, viscoelasticity and workability. Furthermore, in case the trituration type continuous grinder is employed, the secondary energies including a high voltage frictional electricity and heat which are produced by compression, shear and friction occurring during the course of trituration assist in further activating the coal, thus providing a more uniform integral paving composition which have various excellent properties.

In carrying out the method according to the present invention, the paving composition, of which the coal content is at the desired level, may be produced either by incorporating, at the beginning, an amount corresponding to said desired content or by preliminarily preparing a composition of which the coal content is higher than the desired content and then diluting the composition with a component other than coal thereby to obtain the desired paving composition. Moreover, it is noted that the present paving composition can also be produced by mixing coal with an asphalt-free mineral oil, coal oil, fat and oil and/or the like and subsequently triturating the resulting mixture thereby to make it liquid or pasty, whereupon asphalt is added thereto.

The following Examples are given to illustrate the present invention.

EXAMPLE 1

8Kg. of straight asphalt (penetration degree of 100 to 150) were melted by heating to 150° C. To the resulting molten asphalt were added 2Kg. of coal (Jōban Kashima Ten) which have been finely ground to have a granule diameter of less than 100μ, and then sufficiently mixed while stirring to give 9.8kg. of the desired paving composition of about 145° C.

EXAMPLE 2

75Kg. of straight asphalt (penetration degree of 80 to 100) were melted by heating to about 110° C. To the resulting molten asphalt were added 25Kg. of powder (passing a 20-mesh sieve) of brown coal (Jōban Kashima Ten) followed by mixing to form a fluid slurry. The thus formed slurry was continuously supplied to a trituration type grinder with a quern made of silicon carbide (rate of revolution - about 1,500 r.p.m.), in which the coal was triturated, while being mixed, into super micro-granules to obtain 99Kg. of the desired paving composition of about 120° C.

EXAMPLE 3

57Kg. of straight asphalt (penetration degree of 60 to 80) were melted by heating to about 100° C. To the resulting molten asphalt were added 9kg. of naphtha crude oil, 9kg. of kerosene and 25kg. of powder (passing a 10-mesh sieve) of brown coal (Jōban Nakanekē Ten) followed by mixing to form a fluid slurry. The thus formed slurry was continuously supplied to the same grinder as described in Example 2 with a quein made of Alundus (rate of rotation = about 1,500 r.p.m.), in which the coal was triturated, while being mixed, into super micro-granules to obtain 98kg. of the desired paving composition of about 110° C.

EXAMPLE 4

50Kg. of straight asphalt (penetration degree of 60 to 80), 5kg. of blown asphalt (penetration degree of 20 to 30) and 3kg. of petroleum resin (softening point of 60° C.) were melted by heating to about 110° C. To the resulting molten asphalt were added 17kg. of kerosene and 25kg. of powder (passing a 20-mesh sieve) of brown coal (Jōban Nakanokō Tan followed by mixing to form a fluid slurry. The thus formed slurry was supplied to the same grinder as described in Example 2, in which the coal was triturated, while being mixed, into super micro-granules to obtain 98kg. of the desired paving composition of about 115° C.

EXAMPLE 5

57Kg. of straight asphalt (penetration degree of 60 to 80) and 3kg. of petroleum resin (softening point of 80° C.) were melted by heating to about 100° C. To the resulting molten asphalt were added 9kg. of naphtha crude oil, 9kg. of dichloropropane and 22kg. of powder (passing a 10-mesh sieve) of brown coal (Jōban Nakanokō Tan) followed by mixing to form a fluid slurry. The thus formed slurry was supplied to the same grinder as described in Example 2, in which the coal was triturated, while being mixed. The material extruded from said grinder was again introduced into the grinder and fully triturated and mixed up to obtain 98kg. of the desired paving composition of about 120° C.

EXAMPLE 6

59Kg. of straight asphalt (penetration degree of 60 to 80) and 3kg. of petroleum resin (softening point of 50° C.) were melted by heating to 110° C. To the resulting molten asphalt were added 15kg. of kerosene and 17kg. of powder (passing a 20-mesh sieve) of brown coal (Jōban Nakanokō Tan) followed by mixing to form a fluid slurry. The thus formed slurry was supplied together with 6kg. of latex of natural rubber (rubber content of 50%) to the same grinder as shown in Example 2 for trituration and mixing. Said latex of natural rubber was added proportionally to the slurry supply so that the latex addition might be finished when the slurry supply was completed. After 0.2kg. of sulfur powder had been added and well dispersed, the material extruded from said grinder was again introduced into the above-mentioned grinder for further trituration to obtain 95kg. of the desired paving composition of about 120° C.

EXAMPLE 7

58Kg. of straight asphalt (penetration degree of 60 to 80) and 4kg. of copolymer made from 33% vinyl acetate and 67% ethylene, were melted by heating to about 100° C. To the resulting molten asphalt were added 9kg. of naphtha crude oil, 9kg. of dichloropropane and 20kg. of powder (passing a 20-mesh sieve) of brown coal (Jōban Nakanokō Tan) followed by mixing to form a fluid slurry. The thus formed slurry was supplied to the same grinder as described in Example 2, in which the coal was triturated, while being mixed, to obtain 98kg. of the desired paving composition of about 115° C.

EXAMPLE 8

55Kg. of straight asphalt (penetration degree of 60 to 80), 3kg. of petroleum resin and 10kg. of amorphous polypropylene containing a small quantity (less than 5%) of crystalline polypropylene were melted by heating to about 100° C. To the resulting molten asphalt were added 6kg. of naphtha crude oil, 6kg. of petroleum naphtha, 6kg. of dichloropropane and 14kg. of powder (passing a 20-mesh sieve) of brown coal (Jōban Nakanokō Tan) followed by mixing to form a fluid slurry. The thus formed slurry was supplied to the same grinder as described in Example 2, in which the coal was triturated, while being mixed, to obtain 98kg. of the desired paving composition of about 110° C.

EXAMPLE 9

52Kg. of straight asphalt (penetration degree of 60 to 80) and 15kg. of amorphous polypropylene were melted by heating to about 100° C. To the resulting molten asphalt were added 10kg. of kerosene, 4kg. of petroleum naphtha, 4kg. of dichloropropane and 15kg. of powder (passing a 20-mesh sieve) of brown coal (Jōban Kashima Tan) followed by mixing to form a fluid slurry. The thus formed slurry was supplied to the same grinder as described in Example 2, in which the coal was triturated, while being mixed, to obtain 98kg. of the desired paving composition of about 110° C.

EXAMPLE 10

62Kg. of straight asphalt (penetration degree of 60 to 80) were melted by heating to about 110° C. To the resulting molten asphalt were added 9kg. of kerosene, 9kg. of petroleum naphtha and 15kg. of powder (passing a 20-mesh sieve) of brown coal (Jōban Nakanokō Tan) followed by mixing to form a fluid slurry. The thus formed slurry was supplied to the same grinder as described in Example 2, in which 5kg. of synthetic rubber latex (vulcanising agent-containing latex of which the butadien-styrene rubber content is 50%) were added to the slurry and the coal was triturated while being mixed. The synthetic rubber latex was added proportionally to the slurry supply so as to complete the addition of said latex when the slurry supply was completed. The material extruded from said grinder was again introduced into the grinder for further trituration and mixing to obtain 96kg. of the desired paving composition of about 120° C.

EXAMPLE 11

58Kg. of straight asphalt (penetration degree of 60 to 80) were melted by heating to about 100° C. To the resulting molten asphalt were added 8kg. of naphtha crude oil, 8kg. of petroleum naphtha and 15kg. of powder (passing a 20-mesh sieve) of brown coal (Jōban Nakanokō Tan) followed by mixing. Further to the materials above-mentioned was added rubber swollen and softened by adding 5kg. of pine oil and 4kg. of dichloropropane to small pieces of butyl rubber of 2kg. followed by mixing to form a fluid slurry. The thus formed slurry was supplied to the same grinder as described in Example 2, in which the coal was triturated, while being mixed, to obtain 98kg. of the desired paving composition of about 115° C.

EXAMPLE 12

63Kg. of straight asphalt (penetration degree of 60 to 80) were melted by heating to about 100° C. To the resulting molten asphalt were added 9kg. of kerosene, 9kg. of petroleum naphtha, 5kg. of class B reclaimed rubber powder, 14kg. of powder (passing a 20-mesh sieve) of bituminous coal (Akabira Tan) and 0.1kg. of a-chloronaphthalene followed by mixing to form a fluid slurry. The thus formed slurry was supplied to the same grinder as described in Example 2, in which the coal was triturated, while being mixed, to obtain 98kg. of the desired paving composition of about 115° C.

EXAMPLE 13

40Kg. of straight asphalt (penetration degree of 60 to 80) were melted by heating to about 100° C. To the resulting molten asphalt were added 30kg. of kerosene, 10kg. of dichloropropane and 40kg. of powder (passing 20-mesh sieve) of bituminous coal (Akabira Tan) followed by mixing to form a fluid slurry. The thus formed slurry was supplied to the same grinder as described in Example 2, in which the coal was triturated, while being mixed, to obtain a mixture of 110° C. 30kg. of straight asphalt (penetration degree of 40 to 60) which were melted by heating to about 110° C were further added to said mixture and well stirred and mixed to obtain 147kg. of the desired paving composition.

EXAMPLE 14

58Kg. of straight asphalt (penetration degree of 40 to 60) were melted by heating to 80° C. To the resulting molten asphalt were added 3kg. of mobil oil, 3kg. of fatty acid pitch, 5kg. of kerosene and 21kg. of powder (passing a 20-mesh sieve) of bituminous coal (Akabira Tan) followed by mixing to form a fluid slurry. The thus formed slurry was supplied to the same grinder as described in Example 2, in which the coal was triturated while being mixed to obtain a mixture of about 100° C. Further 10 kg. of dichloropropane were added to the mixture and stirred and well mixed up to obtain 98 kg. of the desired paving composition.

EXAMPLE 15

60Kg. of straight asphalt (penetration degree of 60 to 80) were melted by heating to 80° C. To the resulting molten asphalt were added 12kg. of coal tar (Type A, Number 4), 10kg. of creosote and 13kg. of powder (passing 20-mesh sieve) of brown coal (Jōban Nakanokō Tan) followed by mixing to form a fluid slurry. The thus formed slurry was supplied to the same grinder as described in Example 2, in which the coal was triturated while being mixed to obtain a mixture of about 100° C. Further 5kg. of dichloropropane were added to the mixture and they were stirred and mixed well to obtain 97.5kg. of the desired paving composition.

EXAMPLE 16

To 70kg. of road tar (Type A, Number 4) which had been heated to about 60° C were added 15kg. of powder (passing 20-mesh sieve) of bituminous coal (Akabiro Tan) and 15kg. of powder (passing 20-mesh sieve) of brown coal (Jōban Nakanokō Tan) followed by mixing to form a fluid slurry. The thus formed slurry was supplied to the same grinder as described in Example 2, in which the coal was triturated while being mixed to obtain 98kg. of the desired paving composition of about 80° C.

EXAMPLE 17

To 86kg. of road tar (Type B, Number 4) which had been heated to 100° C were added 3kg. of creosote oil and 5kg. of powder (passing 10-mesh sieve) of brown coal (Jōban Nakanokō Tan) followed by mixing to form a fluid slurry, The thus formed slurry was supplied to the same grinder as mentioned in Example 2, when 6kg. of synthetic rubber latex (vulcanising agent-containing latex of which the butadiene-styrene rubber content is 50%) were added to be triturated while being mixed. The synthetic rubber latex was added proportionally to the slurry supply so as to complete the addition of said latex when the slurry supply was completed. The materials discharged from said grinder were again introduced into the grinder for further trituration and mixing to obtain 94kg. of the desired paving composition of 110° C.

EXAMPLE 18

To 89kg. of road tar (Type C, Number 2) which had been heated to 90° C were added 6kg. of copolymer of vinyl acetate and ethylene (33% of vinyl acetate and 67% of ethylene) which had been melted by heating and 5kg. of powder (passing a 20-mesh sieve) of brown coal (Jōban Nakanokō Tan) followed by mixing to form a fluid slurry. The thus formed slurry was supplied to the same grinder as mentioned in Example 2, in which the coal was triturated while being mixed to obtain 98kg. of the desired paving composition of 105° C.

EXAMPLE 19

40 kg. of straight asphalt (penetration degree of 60 to 80) was heated to about 80° C. To the resulting molten asphalt were added 60kg. of kerosene and 40kg. of powder of brown coal to be mixed. The mixture was supplied to iron-made tube mill where the coal was triturated into micro-granules. To the granules were added 60kg. of straight asphalt (penetration degree of 60 to 80) which had been melted by heating to 90° C, followed by mixing to obtain 197kg. of the desired paving composition.

EXAMPLE 20

57 Kg. of straight asphalt (penetration degree of 80 to 100) were melted by heating to about 100° C. To the resulting molten asphalt were added 10kg. of B heavy oil, 9kg. of tetrachloroethylene, 2kg. of tetrahydronaphthalene and 16kg. of powder (passing a 25-mesh sieve) of brown coal (Jōban Nakanokō Tan) followed by mixing to form fluid slurry. This slurry was supplied to the same grinder as described in Example 2, where 2kg. of latex of butadiene-stylene rubber (rubber content of 50%), 4kg. of emulsified ethylenevinyl acetate copolymer (ethylene=35%) (copolymer content =50%) were added to be mixed and triturated. The latex of butadiene-styrene rubber and the emulsified copolymer were added proportionally to the slurry supply so as to complete the addition of the above-mentioned materials when the slurry supply was completed. The materials discharged from said grinder were again introduced into the grinder for further trituration and mixing to obtain 96kg. of the desired paving composition of 115° C.

EXAMPLE 21

55 Kg. of straight asphalt (penetration degree of 60 to 80) were melted by heating to about 100° C. To the resulting molten asphalt were added 8kg. of B heavy oil, 8kg. of dichloropropane, 8kg. of fish oil, 20kg. of powder (passing a 30-mesh sieve) of brown coal (Jōban Nakanokō Tan) and 1kg. of magnesium soap, followed by mixing to form fluid slurry. The thus formed slurry was supplied to the same grinder as described in Example 2, in which the coal was triturated while being mixed to obtain 98kg. of the desired paving composition of 110° C.

The nature of the paving composition of the present invention is widely variable depending on the kinds and natures of the asphalt and coal which are employed as raw materials, the mixing ratio of the both and whether or not additives and solvent are present. Various natures of paving compositions range from a fluid one to a semisolid one. Yet, in general, as compared with the conventional bitumen paving materials including asphalt, cutback asphalt and tar, the present paving composition has the excellent properties as follows:

1. The present composition is exceedingly low in heat sensibility, and even when exposed direct to the sun in summer it scarcely causes flowage. Workability is superior at higher temperatures.

2. The present composition has a high cold weather resistance and is prevented from becoming fragile even at lower temperatures.

3. The present composition has an excellent adhesive property and high sticking strength to a natural aggregate such as crushed stone, pebbles or sand as well as a baked artificial aggregate such as slag, Synopeari and Luxobite, and cement concrete product.

4. When a volatile solvent is contained, the coal granules present in the present composition serve to promote to distill off the solvent. As a result, the present paving composition tends to rapidly harden and is stable thereby to exert a high sticking strength, as compared with the conventional paving material containing no coal granules.

5. The present composition shows a non-Newtonian flow and is excellent in viscoelasticity. Moreover, a high adhesive property is obtained by applying pressure.

6. Water resistance, weather resistance and chemical resistance are superior.

Next, the results of the tests on characteristics of the present paving compositions will be given in comparison with those of the conventional paving materials (Table 3 and Table 4).

From tables 3 and 4, the important properties such as heat sensibility, cold weather resistance, adhesive property and solvent distilling property (sticking strength) can be read as follows:

i. Heat sensibility: it can be read by referring to the data on the flow test, penetration and softening point.

ii. Cold weather resistance: it can be read by referring to the data on the Frea$\beta$ breaking point, penetration and softening point.

iii. Adhesive property: it can be read by referring to the data on the exfoliation test and retaining Marshall stability.

iv. Solvent distilling property (sticking strength): the paving material is occasionally cutback by diluting with a volatile solvent so that the viscosity of the composition may be reduced thereby to improve workability. In this connection, it is to be noted that there is a great difference in a solvent distilling property between the conventional cutback asphalt containing no coal granule and the present paving composition containing coal micro-granules, leading to a great difference in the sticking strength therebetween. In order to substantiate this fact, the following tests were carried out.

2000. of each specimen of Composition A, Composition B, Composition C and Composition D as shown in Table 1 were placed in a flask, and then were subjected to a 260° C. — distillation test in accordance with ASTM D402 — 55. The results are summarized in Table 2. As is apparent from Table 2, the present paving Composition A containing coal micro-granules shows a large amount of distillation thereby to obtain a sticking strength early, compared with the Composition D and the Composition C containing diatomaceous earth micro-granules and lime stone micro-granules, respectively, and the Composition D containing no micro-granules.

Table 1

| Specimen | Composition of specimen (% by weight) | | | | |
|---|---|---|---|---|---|
| | Asphalt | Coal | Diatomaceous earth | Lime stone | Solvent |
| the present composition | 58 | 25 | — | — | 17 |
| comparative composition | 58 | — | 25 | — | 17 |
| " | 58 | — | — | 25 | 17 |
| " | 63 | — | — | — | 17 |

Table 2

| Specimen | | Distillation temperature (°C.) | | | | | | | | | | |
|---|---|---|---|---|---|---|---|---|---|---|---|---|
| | | 100 | 120 | 130 | 140 | 150 | 160 | 180 | 200 | 220 | 240 | 260 |
| A | Amount of distillate (% by volume) | Initial boiling | 19 | — | 28 | 36 | 42 | 46 | 50 | 51 | | |
| B | | Initial boiling | 5 | — | 12 | — | 18 | 25 | 33 | 38 | 45 | 48 |
| C | | | Initial boiling | 4 | — | 13 | 24 | 30 | 35 | 40 | 45 | |
| D | | | | Initial boiling | 3 | 10 | 20 | 28 | 33 | 43 | | |

Note
i. Asphalt was a straight asphalt having a penetration degree of 66.
ii. Diatomaceous earth and lime stone each having a granule diameter passing a 300-mesh sieve were employed, followed by mixing.
iii. A mixture of 50% by weight of a crude oil and 50% by weight of dichloropropane was employed as solvent.
iv. The Composition A was produced by diluting with solvent a composition which has previously been prepared without the solvent.

Table 3

Result of tests on characteristics of two-component system compositions (with comparative tests)

| Specimen | N: Non-triturated P: Triturated N-0 | N-3 | N-5 | N-10 | N-20 | N-30 | N-40 | N-45 | N-50 | N-60 | |
|---|---|---|---|---|---|---|---|---|---|---|---|
| Composition of specimen (% by weight) | Straight asphalt (penetration degree or 60 to 80) | 100 | 97 | 95 | 90 | 80 | 70 | 60 | 53 | 50 | 40 |
| | Coal micro-granule (passing a 100-mesh sieve | 0 | 3 | 5 | 10 | 20 | 30 | 40 | 45 | 50 | 60 (Impossible to mix) |
| Properties of Composition | (1) Specific gravity | 1.02 | 1.03 | 1.04 | 1.07 | 1.10 | 1.12 | 1.13 | 1.15 | 1.16 | — |
| | (2) Penetration (25° C., 100g., 5sec.) | 70 | 57 | 55 | 50 | 41 | 38 | 29 | 27 | 19 | — |
| | (3) Softening point (R & S method). °C. | 48 | 49 | 49 | 51 | 55 | 60 | 63 | 70 | 90 | — |
| | (4) Ductility (25° C.). cm. | 100 | 72 | 68 | 50 | 38 | 19 | 9 | 6 | 2 | — |
| | (5) Flow test, mm. (Iron plate placed at an angle of inclination of 75° C. 39° C. 6hrs. | 50 | 40 | 39 | 37 | 22 | 15 | 2 | 0.2 | 0.2 | — |
| Specimen | N: Non-triturated P: Triturated | P-3 | P-5 | P-10 | P-20 | P-30 | P-40 | P-45 | P-50 | P-60 | Testing method |
| Composition of specimen (% by weight) | Straight asphalt (penetration degree 97 of 60 to 80) | 95 | 90 | 80 | 70 | 60 | 55 | 50 | 40 | | |
| | Coal micro-granule (passing a 100-mesh sieve) | 3 | 5 | 10 | 20 | 30 | 40 | 45 | 50 | 60 (Impossible to mix) | |
| | (1) Specific gravity | 1.03 | 1.04 | 1.07 | 1.10 | 1.12 | 1.13 | 1.15 | 1.16 | — | JI3 E 2249–1961 |
| | (2) Penetration (25° C., 100g., 5sec. | 55 | 54 | 49 | 47 | 40 | 30 | 28 | 20 | — | JIS X 2570–1960 |
| | (3) Softening point (N & B method), °C. | 48 | 51 | 53 | 54 | 58 | 61 | 66 | 91 | — | JIS K 2571–1960 |
| | (4) Ductility (25° C.), cm. | 88 | 88 | 55 | 43 | 20 | 10 | 9 | 2 | — | JIS K 2532–1960 in the manner |
| | (5) Flow test, mm. (Iron plate placed at an angle of in- | 39 | 39 | 33 | 20 | 12 | 2 | 0.2 | 0.1 | | as described in FS-SS-R 406C–19–51 |

Table 3-continued

Result of tests on characteristics of two-component system compositions (with comparative tests)

clination of 75° C, 39° C. 5hrs.)

(6) viscosity, centistokes

| Temp | | | | | | | | | | |
|---|---|---|---|---|---|---|---|---|---|---|
| 100° C | 6870 | | | | | 14500 | | | | |
| 120 | 1500 | 1750 | 1920 | | | 4270 | | | Impossible to measure | — |
| 130 | 880 | 946 | 1010 | | | 2050 | | | | — |
| 140 | 470 | 528 | 577 | 840 | 271 | 1200 | | | | — |
| 150 | 265 | 337 | 360 | 420 | 480 | 600 | | | | — |
| 160 | | | | 210 | 266 | 320 | | | — | — |
| 170 | | | | 130 | 150 | 200 | 955 | 1140 | — | — |
| 180 | | | | | | | 800 | 970 | — | — |
| 190 | | | | | | | 510 | 630 | — | — |
| 200 | | | | | | | 321 | 440 | — | — |

(7) From β breaking point, °C: −8, −8, −8, −8, −8, −8, −8, −7, −6, —

(8) Sedimentation test of coal (160°/160° C., 5mm.): —, 4.7, 5.2, 7.0, 7.2, 8.0, 7.5, 6.0, 5.5, —

(9) Exfoliation test of coat on aggregate
Dry lime stone, exfoliation %: 100, 35, 35, 19, 19, 0, 0, 0, —, —
Dry andesite, exfoliation %: 100, 100, 100, 8, 0, 0, 0, 0, —, —

(10) Marshall stability test (immerged in water at 60° C. for 30 min.) Stability, kg: 518, 865, 852, 922, 921, 935, 1085, 1053, —, —

(11) -Ditto- (lowered in water at 60° C. for 48hrs.) Retaining stability,%: 80, 83, 86, 89, 87, 88, 87, 90, —, —

(6) viscosity, centistokes

| Temp | | | | | | | | | | |
|---|---|---|---|---|---|---|---|---|---|---|
| 100° C | | | | | | 15400 | | | — | |
| 120 | 1880 | 2020 | | | | 5130 | | | Impossible to measure | — |
| 130 | 1058 | 1152 | | | | 2740 | | | | — |
| 140 | 528 | 596 | 860 | 1420 | 1600 | | | | | — |
| 150 | 337 | 367 | 340 | 615 | 900 | | | | | — |
| 160 | | | 340 | 403 | 520 | | | | — | — |
| 170 | | | 220 | 284 | 320 | 1150 | 1480 | | — | — |
| 180 | | | | | | 737 | 1200 | | — | — |
| 190 | | | | | | 531 | 940 | | — | — |
| 200 | | | | | | 372 | 522 | | — | — |

(7) From β breaking point, °C: −10, −10, −9, −9, −9, −9, −9, −9, —  — DIN.U6 IF 80

(8) Sedimentation exfoliation%: 0.5 / 1.6, 1.0 / 2.0, 1.2 / 2.3, 1.5 / —, in the manner test of coal granules (160° C., 5hrs.)

(9) Exfoliation test of coat on aggregate
Dry lime stone, exfoliation %: 11, 11, 10, 4, 0, 0, 0, —, —
Dry andesite, exfoliation %: 100, 90, 6, 0, 0, 0, 0, —, —

(10) Marshall stability test (immersed in water at 60° C. for 30 min.) stability, kg: 824, 804, 794, 820, 971, 984, 1183, —, — — ASTM D 1559-62T (11) -Ditto- (immersed in water at 60° C. for 48 hrs.) Retaining stability, %: 88, 87, 89, 92, 93, 94, 50, —, —

Notes column:
- Calculated from the value measured b7 EN type rotation visconator
- as described in Note 1)
- in the manner as described in Note 2)

Table 4

Results of tests on characteristics of multi-component system composition (with comparative tests)

| Specimen | N: Non-triturated<br>P: Triturated | N-No.1 | N-No.2 | N-No.3 | N-No.4 | N-No.5A | N-No.5B | N-No.6A | N-No.6B | N-No.7A | N-No.7B |
|---|---|---|---|---|---|---|---|---|---|---|---|
| Composition of specimen (% by weight) | Straight asphalt (penetration degree of 60 to 80) | 100 | 83 | 97 | 80 | 70 | 70 | 58 | 58 | 72 | 72 |
| | crude oil | — | 8.5 | — | 8.5 | — | — | 8.5 | 8.5 | — | — |
| | dichloropropane | — | 8.5 | — | 8.5 | — | — | 8.5 | 8.5 | — | — |
| | petroleum resin | — | —3 | 3 | — | — | — | — | 3 | 3 | |
| | coal micro-granules (passing a 150-mesh) sieve | — | — | — | — | 30 | 30 | 25 | 25 | 25 | 25 |
| | (1) Specific | 1.03 | | | | 1.17 | 1.17 | | | | |

Table 4-continued

Results of tests on characteristics of multi-component system composition (with comparative tests)

| | | | | | | | | | | | |
|---|---|---|---|---|---|---|---|---|---|---|---|
| Properties of composition (Prior to distillation) | gravity | | | | | | | | | | |
| | (2) Flash point, °C. | | 80 | | 83 | | | | | | |
| | (3) Float test (50° C.), sec. | — | 50 | — | 60 | — | — | 180 | 180 | — | — |
| | (4) Viscosity, centistokes | | | | | | | | | | |
| | 70° C. | | 948 | | 968 | | | | | | |
| | 80 | 502 | 971 | | | | | | | | |
| | 90 | | 290 | | 234 | | | | | | |
| | 100 | 6890 | 172 | 4450 | 156 | 14500 | 13250 | 418 | 403 | 10900 | 9570 |
| | 110 | 3140 | | 2260 | | 7600 | 6300 | 334 | 290 | 4700 | 3420 |
| | 120 | 1500 | 1180 | | 4270 | 3570 | 239 | 212 | 2450 | 2820 | |
| | 130 | 880 | | 685 | | 2050 | 1630 | 257 | 173 | 1080 | 982 |
| | 140 | 470 | | 340 | | 980 | 930 | 127 | 146 | 870 | 855 |
| | 150 | | | | | 585 | 546 | | | 520 | 490 |

| Specimen | N: Non-triturated P: Triturated | N-No.8A | N-No.8B | N-No.2 | P-No.3 | P-No.4 | P-No.5A | P-No.5B | P-No.6A | P-No.6B |
|---|---|---|---|---|---|---|---|---|---|---|
| Composition of specimen (% by weight) | Straight asphalt (penetration degree of 60 to 80) | 56 | 56 | 83 | 97 | 80 | 70 | 70 | 58 | 38 |
| | crude oil | 8.5 | 8.5 | 8.5 | — | 8.5 | — | — | 8.5 | 8.5 |
| | dichloropropane | 8.5 | 8.5 | 8.5 | — | 8.5 | — | — | 8.5 | 8.5 |
| | petroleum resin | 3 | 3 | — | 3 | 3 | — | — | — | — |
| | coal micro-granules (passing a 150-mesh sieve) | 24 | 24 | — | — | — | 30 | 30 | 25 | 25 |
| Proportion of composition (Prior to distillation) | (1) specific gravity | | | | | 1.00 | | | | |
| | (2) Flash point, °C. | 83 | 83 | 110 | | 109 | | | | |
| | (3) Float test (50° C.), sec. | 200 | 200 | 59 | — | 68 | — | — | 200 | 200 |
| | (4) Viscosity, centistokes | | | | | | | | | |
| | 70° C. | | | 955 | | 965 | | | | |
| | 80 | | | 634 | | 466 | | | | |
| | 90 | | | 310 | | 272 | | | | |
| | 100 | 435 | 380 | 206 | 4640 | 164 | 15400 | 13920 | 745 | 742 |
| | 110 | 317 | 270 | | 2470 | | 8550 | 7700 | 506 | 510 |
| | 120 | 223 | 212 | | 1410 | | 5130 | 6000 | 288 | 269 |
| | 130 | 146 | 167 | | 886 | | 2740 | 1920 | 191 | 227 |
| | 140 | 106 | 131 | | 440 | | 1110 | 1070 | 163 | 107 |
| | 150 | | | | | | 830 | 690 | | |

| Specimen | N: Non-triturated P: Triturated | P-No. 7A | P-No. 7B | P-No. 8A | P-No. 8B | Testing method |
|---|---|---|---|---|---|---|
| Composition of specimen (% by weight) | Straight asphalt (penetration degree or 60 to 80) | 72 | 72 | 56 | 56 | Letter A shows that the specimen contains, as a coal, Joban Kashima Tan which will not swell when it is impregnated with 5% NaOH solution and heated. |
| | crude oil | — | — | 8.5 | 8.5 | Letter B shows that the specimen contains, as a coal, Joban Nakanoko Tan which will easily swell when it is impregnated with 5% NaOH solution at normal temperature. |
| | dichloropropane | — | — | 8.5 | 8.5 | |
| | petroleum resin | 3 | 3 | 3 | 3 | |
| | coal micro-granules (passing a 150-mesh sieve) | 25 | 25 | 24 | 24 | |
| Proportion of composition (Prior to distillation | (1) Specific gravity | | | 1.11 | 1.11 | (JIS X 2249-1961) |
| | (2) Flash point,° C | | | 115 | 115 | (JIS X 2803) |
| | (3) Float test (50° C.), sec. | — | — | 220 | 220 | (ASTM, D139-49) |
| | (4) Viscosity, centistokes | | | | | Calculated from the valve obtained by the Sayboit Parel viscosity test, with regard to the composition containing solvent (ASTM, Z102-57). Calculated from the value measured by a BN type rotation viscometer, with regard to the conposition containing no solvent. |
| | 70° C. | | | | | |
| | 80 | | | | | |
| | 90 | | | | | |
| | 100 | 13700 | 10250 | 581 | 645 | |
| | 110 | 6670 | 4360 | 352 | 433 | |
| | 120 | 3110 | 2740 | 222 | 237 | |
| | 130 | 1720 | 1280 | 163 | 183 | |
| | 140 | 940 | 908 | 121 | 142 | |
| | 150 | 620 | 589 | | | |
| | (5) Sedimentation test of coal granules | | | | | |
| | 100° C. 5hrs.% | — | — | — | — | 9.0 | 9.0 | — | — |
| | 160° C. 5hrs.% | — | — | — | — | 7.0 | 8.5 | — | — | 7.0 | 7.0 |
| | (6) Exfoliation test | | | | | |

Table 4-continued

Results of tests on characteristics of multi-component system composition (with comparative tests)

| | | | | | | | | | | | |
|---|---|---|---|---|---|---|---|---|---|---|---|
| | of coat on aggregate Dry lime stone exfoliation % | 100 | 100 | 100 | 100 | 0 | 0 | 0 | 0 | 0 | 0 |
| | Wet lime stone exfoliation % | 100 | 100 | 100 | 100 | 0 | 0 | 80 | 80 | 0 | 0 |
| | Dry andosite exfoliation % | 100 | 100 | 100 | 100 | 0 | 0 | 0 | 0 | 0 | 0 |
| | Wet andosite exfoliation % | 100 | 100 | 100 | 100 | 0 | 0 | 100 | 100 | 0 | 0 |
| Properties of residue from distillation was effected at 200° C, under a reduced pressure of 10 mmHg until oil was no longer distilled, and the residue from distillation was used as specimen. As to the composition containing no solvent, it was, as such, used as specimen. | (7) Penetration 25° C., 100g., 5sec. | 59 | 120 47 | 94 | 41 | 41 | 74 | 74 | 35 | 35 | |
| | 0° C.200g., 60 sec. | 9 | 22 | 9 | 19 | 10 | 10 | 18 | 18 | 10 | 10 |
| | −3° C., 200g., 60sec. | 6 | 12 | 6 | 9 | 6 | 6 | 10 | 9 | 6 | 6 |
| | (8) Softening point, °C | 50 | 43 | 52 | 45 | 53 | 53 | 47 | 47 | 54 | 54 |
| | (9) Ductility 25° C.,ea | 100 | 100 | 100 | 100 | 17 | 17 | 37 | 47 | 18 | 18 |
| | (10) Flow test, mm. Iron plate placed at an angle of inclination of 75°, 39° C, 2hrs.) | 31 | 69 | 31 | 60 | 7 | 10 | 19 | 22 | 8 | 10 |
| | (11) Errap breaking point, °C | −5 | −12 | −3 | −12 | −5 | −5 | −12 | −12 | −3 | −3 |
| | Marshall stability test (immersed in water at 60° C. for 30. min.) | 759 | 450 | 791 | 594 | 812 | 915 | 810 | 706 | 835 | 862 |
| | (13) stability, kg. | 90 | 72 | 85 | 80 | 83 | 87 | 88 | 85 | 86 | 89 |
| | -Ditto- (immersed in water at 60° C. for 48hrs.) Retaining Stability | 89 | 72 | 85 | 88 | 83 | 87 | 88 | 85 | 86 | 89 |
| Properties of Composition (Prior to distillation) | (5) Sedimentation test of equal granules 100° C. 5hrs.% | | | | | | | 1.0 | 1.0 | 0.5 | 1.0 |
| | 180° C. 5hrs.% | 8.5 | 8.0 | | | | | | | | |
| | | — | — | | | | | | | | |
| | (6) Exfoliation test of coat on aggregate Dry lime stone exfoliation % | 0 | 0 | 100 | 100 | 100 | 0 | 0 | 0 | 0 | |
| | Wet lime stone exfoliation % | 50 | 50 | 100 | 100 | 100 | 0 | 0 | 10 | 10 | |
| | Dry andesite exfoliation % | 0 | 0 | 100 | 100 | 100 | 0 | 0 | 0 | 0 | |
| | Wet andesite exfoliation % | 30 | 30 | 100 | 100 | 100 | 0 | 0 | 0 | 0 | |
| Properties of residue from distillation The distillation was effected at 200° C, under a Reduced pressure of 10 mmHg until oil was no longer distilled and the residue from distillation was used as specimen. As to the composition containing no solvent, it was, as such, used as specimen. | (7) Penetration 25° C. 100 g., 5sec. | 58 | 52 | 130 | 48 | 94 | 40 | 39 | 78 | 80 | |
| | 0° C. 200g., 60sec. | 13 | 12 | 29 | 9 | 19 | 10 | 20 | 19 | | |
| | −5° C., 200g.,60sec. | 8 | 8 | 12 | 6 | 12 | 6 | 6 | 10 | 10 | |
| | (8) Softening point, °C 30 | 45 | 43 | 51 | 45 | 53 | 53 | 47 | 47 | | |
| | (9) Ductility 25° C.,cm | 38 | 38 | 100 | 100 | 100 | 15 | 15 | 39 | 49 | |
| | (10) Flow test, mm. (From plate placed at an angle of inclination of 75°, 39° C. 2 hrs.) | 14 | 15 | 70 | 30 | 60 | 6 | 8 | 17 | 20 | |
| | (11) From βbreaking point, °C | −12 | −12 | −12 | −3 | −12 | −6 | −6 | −13 | −13 | |
| | (12) Marshall stability test (immersed in water at 60° C. for 30min..) Stability, kg. | 813 | 729 | 403 | 830 | 576 | 813 | 876 | 761 | 650 | |
| | (13) -Ditto- (immersed in water at 60° C. for 48hrs.) Retaining stability,% | 84 | 90 | 69 | 64 | 86 | 85 | 88 | 87 | 92 | |
| Properties of | (5) Sedimentation test of each granules | | | | | in the manner as described in Note 1) | | | | | |
| composition (Prior to distillation) | 100° C. 5hrs % | | | 0 | 0.5 | | | | | | |
| | 160° C. 5hrs % | 1.0 | 1.0 | | | | | | | | |
| | (6) Exfoliation test | | | | | in the manner as described in Note 2) | | | | | |
| | of coat on aggregate | | | | | | | | | | |

Table 4-continued
Results of tests on characteristics of multi-component system composition (with comparative tests)

| | | | | | | |
|---|---|---|---|---|---|---|
| | Dry lime stone exfoliation % | 0 | 0 | 0 | 0 | |
| | Wet lime stone exfoliation % | 0 | 0 | 0 | 0 | |
| | Dry andesite exfoliation % | 0 | 0 | 0 | 0 | |
| | Wet andesite 0 exfoliation % | 0 | 0 | 0 | | |
| Properties of | (7) Penetration | | | | | (JIS K 2530-1961) |
| residue from distillation | 25° C.,100g.,5sec. | 35 | 35 | 62 | 57 | |
| The distillation | 0° C.,200g.,60sec. | 10 | 10 | 14 | 13 | |
| was effected at | −5° C.,200g.,60sec. | 6 | 6 | 10 | 9 | (JIS K 2531-1960) |
| | (8) Softening point ° C | 54 | 54 | 49 | 48 | |
| 200° C under a | (9) Ductility 25° C.,mm. | 17 | 17 | 46 | 42 | (JIS K 2532-1960) |
| reduced pressure | (10) Flow test, mm. | 7 | 9 | 12 | 14 | in the manner as described in (FS.SS-R 406C-1951) |
| of 10mmHg | (Iron plate placed at | | | | | |
| until oil was no longer distilled, and the residue from distillation | an angle of inclination of 75°, 39° C. 2hrs.) | | | | | |
| | (11) From β breaking point, ° C | −4 | −4 | −13 | −13 | (DIN. U6 IP 20) |
| was used as specimen. As to the composition | (12) Marshall stability test (immersed in water at 60° C. for 30min.) Stability, kg. | 960 | 935 | 800 | 855 | (ASTM D1559-62T) |
| containing no solvent, it was as such, used as specimen. | (13) -Ditto- (immersed in water at 60° C. for 48 hrs.) Retaining stability, % | 98 | 93 | 93 | 95 | |

Note
1) Method of exfoliation test
 i. In case the aggregate is dry:
100G. of aggregate (crushed stone) having a diameter of 10 to 13mm are well washed with water, then placed in a thermostat type furnace kept at 130° C. and heated there for more than 30 minutes. To the heated aggregates are added 5g. of specimen which are heated to 130° C, followed by agitation using an agitating stick until the surfaces of the aggregates are completely coated with the specimen. The thus coated aggregates are spread on a glass plate, then allowed to stand at room temperature for 1 hour, and subsequently immersed in hot water at 80° C, for 30 minutes. Whereupon, the exfoliation rate is evaluated according to the following formula.

$$\text{Exfoliation rate \%} = \frac{\text{Number of exfoliated aggregates}}{\text{Total number of aggregates}} \times 100$$

wherein the aggregate having an angle or edge portion not coated with the specimen is regarded as an exfoliated one.
 ii. In case the aggregate is wet:
100G. of aggregates (crushed stone) having a diameter of 10 to 13mm are well washed with water, then immersed in distilled water and subsequently placed, as it is, in a thermostat type furnace kept at 60° C, whereupon they are allowed to stand for 30 minutes. The aggregates are taken out of water and the excessive water is removed. To these wet aggregates are added 6g. of specimen heated to 120° C., followed by wholly heating to 120° C while agitating by an agitating stick. The agitation is continued for 5 minutes until the surfaces of the aggregates are completely coated with the specimen. The thus coated aggregates are spread on a glass plate, then allowed to stand at room temperature for 1 hour and subsequently immersed in hot water at 80° C, for 30 minutes. Whereupon, the exfoliation rate is evaluated in the same manner as described in the preceding item i).

2. Sedimentation test of coal granules:
An iron-made cylindrical vessel with an inside diameter of 40mm and a depth of 300mm is charged, to a level as high as 340mm in depth, with specimen heated to a predetermined temperature of 100 or 160° C. The thus charged vessel is placed in a thermostat type furnace kept at a predetermined temperature of 100° or 160° C. and then allowed to stand for 5 hours. Whereupon, the specimen is taken out of the vessel in such manner that a portion A corresponding to 115mm in depth and another portion B corresponding to 115mm in depth are discharged from the vessel at its top and bottom respectively. The respective coal granule contents of the portions A and B are extracted with benzene using a Soxhlet's extractor and expressed in terms of %. The difference between both the contents is defined as a sedimentation (%).

Prior to use, the present paving composition is normally heated to lower its viscosity. Said paving composition may also be used after lowering its viscosity by adding petroleum solvents, coal solvents or other organic volatile solvents or it may be used at normal or a little elevated temperature after increasing fluidity by forming an emulsion thereof.

The present paving composition is, using the so-called mixing method at normal or elevated temperature or the so-called permeating method at normal or elevated temperature, applicable for pavement, surface treatment and dust-proof treatment, of road, bridge, air port, playground, ground, motorpool, parking space, platform, cargospace, etc.; stabilization treatment for roadbed or soil and stabilization treatment for rail bed, and as adhesive agent for embankment of shore, river or waterway and adhesive filters for joints or cracks of the material to be paved.

The paving composition is further applicable as water-proof materials for protective construction of embankment, waterway, reservoir, bank or structure of dum, underground parking space or ordinary structure, anticorrosive material for metals or points for electrical insulator. Besides it is suitable not only for surface treatment of the material to be paved but also as an adhesive agent for pre-mixed mixture used for mending or mixture used for laminate pavement by virtue of its specific adhesive property which is further improved by pressure or such property that solvent used for cutback is easy to evaporate, thereby permitting traffic immediately after installation. When the paving composition is utilized for the surface of road pavement, the scattering of aggregates and crack can advantageously be minimized. Even though it is employed in rather large quantity, softening and flowage or flashing is hardly caused even at elevated temperature in summer due to its strong adhesive property and sticking strength, excellent dynamic viscoelasticity, cold weather resistance and hot weather resistance.

According to the present invention, there can be manufactured a paving composition with proper abrasion.

Such a paving composition, when used as an adhesive agent for surface of pavement, can maintain the road surface always fresh and rough, because it is worn together with aggregates, thus showing a remarkable effect against skidding.

What is claimed is:

1. A paving composition, consisting essentially of:
from 3 to 50% by weight of microgranular undigested coal particles having a particle size in the range of 1 to 30μ;
the balance is a bituminous material which is liquid at a temperature below about 200° C. and consisting principally of asphalt, said asphalt being at least about 50% by weight of the total weight of the composition;
said composition being free of mineral aggregate particles, said coal particles being uniformly mixed with and dispersed in the bituminous material, said composition having been prepared by simultaneous trituration of said coal particles and said bituminous material at a temperature below about 200° C. by flowing a mixture of said bituminous material and coal particles between the opposing surfaces of a pair of closely spaced triturating discs, one of which is rotating relative to the other, to subject the mixture to simultaneous compression, shear, friction and centrifugal forces.

2. A paving composition as claimed in claim 1, wherein the bituminous material contains at least one additive selected from the group consisting of (1) tars selected from the group consisting of coal tar and oil gas tar; (2) pitches selected from the group consisting of tar pitch, styrene tar pitch, fatty acid pitch and tall oil pitch; (3) natural rubber and synthetic rubber selected from the group consisting of butadiene-styrene rubber, butadieneacrylonitrile rubber, chloroprene rubber, polyisobutylene rubber, polyisoprene rubber, polybutadiene rubber and butyl rubber; (4) fats and oils selected from the group consisting of bean oil, linseed oil, fish oil and whale oil; (5) synthetic resins selected from the group consisting of polyvinyl chloride, polyethylene, ethylene-vinyl acetate copolymer, ethylene-vinyl alcohol copolymer, polypropylene and propylene-ethylene copolymer; (6) natural resins selected from the group consisting of turpentine and rosin; (7) petroleum resins; (8) natural resin oils selected from the group consisting of pine root oil and turpentine oil; (9) coal oils selected from the group consisting of creosote and anthracene; (10) chlorine-containing organic solvents selected from the group consisting of α-chloronaphthalene, tetrachloroethylene, trichloroethylene, methylene chloride, dichloropropane and carbon tetrachloride; (11) tetrahydronaphthalene; and (12) metallic soaps selected from the group consisting of Ca, Mg, Zn, Al and Fe soaps.

3. A paving composition as claimed in claim 2, wherein said tar is incorporated in an amount of 3 to 30% by weight, based on the weight of the paving composition.

4. A paving composition as claimed in claim 2, wherein said pitch is incorporated in an amount of 5 to 20% by weight, based on the weight of the paving composition.

5. A paving composition as claimed in claim 2, wherein said rubber is incorporated in an amount of 0.5 to 5% by weight, based on the weight of the paving composition.

6. A paving composition as claimed in claim 2, wherein said fat and oil is incorporated in an amount of 2 to 10% by weight, based on the weight of the paving composition.

7. A paving composition as claimed in claim 2, wherein said synthetic resin is incorporated in an amount of 0.5 to 10% by weight, based on the weight of the paving composition.

8. A paving composition as claimed in claim 2, wherein said natural resin or petroleum resin is incorporated in an amount of 1 to 10% by weight, based on the weight of the paving composition.

9. A paving composition as claimed in claim 2, wherein said natural resin oil is incorporated in an amount of 1 to 10% by weight, based on the weight of the paving composition.

10. A paving composition as claimed in claim 2, wherein said coal oil is incorporated in an amount of 3 to 15% by weight, based on the weight of the paving composition.

11. A paving composition as claimed in claim 2, wherein said chlorine-containing organic solvent is incorporated in an amount of 1 to 30% by weight, based on the weight of the paving composition.

12. A paving composition as claimed in claim 2, wherein said tetrahydronaphthalene is incorporated in an amount of 0.5 to 8% by weight, based on the weight of the paving composition.

13. A paving composition as claimed in claim 2, wherein said metallic soap is incorporated in an amount of 0.1 to 2% by weight, based on the weight of the paving composition.

14. A method for producing a paving composition, which comprises the steps of
   1. feeding into the narrow gap between a pair of opposed, closely spaced triturating discs, one of which is rotating relative to the other at a high speed, a starting mixture free of particles of mineral aggregate and consisting essentially of
      a. from 3 to 50% by weight of undigested coal particles, and
      b. the balance is a liquid bituminous material consisting principally of asphalt, said asphalt being at least about 50% by weight of the total weight of said starting mixture,
   2. triturating said starting mixture by subjecting same to simultaneous compression, shear, friction and centrifugal forces between said discs at a temperature below about 200° C. to subdivide the coal particles to a size in the range of 1 to 30μ and simultaneously uniformly mixing and dispersing the coal particles in the liquid bituminous material.

15. A method for producing a paving composition as claimed in claim 3, wherein said bituminous material further contains at least one additive selected from the group consisting of (1) tars selected from the group consisting of coal tar and oil gas tar; (2) pitches selected from the group consisting of tar pitch, styrene tar pitch, fatty acid pitch and tall oil pitch; (3) natural rubber and synthetic rubber selected from the group consisting of butadiene-styrene rubber, butadiene-acrylonitrile rubber, chloroprene rubber, polyisobutylene rubber, polyisoprene rubber, polybutadiene rubber and butyl rubber; (4) fats and oils selected from the group consisting of bean oil, linseed oil, fish oil and whale oil; (5) synthetic resins selected from the group consisting of polyvinyl chloride, polyethylene, ethylene-vinyl acetate copolymer, ethylene-vinyl alcohol copolymer, polypropylene and propylene-ethylene copolymer; (6) natural resins selected from the group consisting of turpentine and rosin; (7) petroleum resin; (8) natural resin oils selected from the group consisting of pine root oil and turpentine oil; (9) coal oils selected from the group consisting of creosote and anthracene; (10) chlorine-containing organic solvents selected from the group consisting of α-chloronaphthalene, tetrachloroethylene, trichloroethylene, methylene chloride, dichloropropane and carbon tetrachloride; (11) tetrahydronaphthalene; and (12) metallic soaps selected from the group consisting of Ca, Mg, Zn, Al and Fe soaps.

16. A method for producing a paving composition, which comprises the steps of:
   1. feeding into the narrow gap between a pair of opposed closely spaced triturating discs which are rotating relative to each other at a high speed, a mixture consisting essentially of:
      a. an asphalt-free oil,
      b. undigested coal particles, the coal particles being the sole particulate material in the mixture,
   2. triturating the mixture by subjecting same to simultaneous compression, shear, friction and centrifugal forces between said discs, at a temperature below about 200° C., to subdivide the coal particles to a size in the range of 1 to 30μ and simultaneously uniformly mixing and dispersing the coal particles in the oil, and
   3. adding asphalt to the mixture to obtain a composition containing from 3 to 50% by weight of coal particles.

* * * * *

UNITED STATES PATENT AND TRADEMARK OFFICE
CERTIFICATE OF CORRECTION

PATENT NO. : 4 008 095
DATED : February 15, 1977
INVENTOR(S) : Fumiaki Fukushima, Hiroshi Nozaki, Keisuke Tanaka and Takashi Kanazawa It is certified that error appears in the above-identified patent and that said Letters Patent are hereby corrected as shown below:

Please change the inventor from "Takashi Kanagawa" to ---Takashi Kanazawa---.

Column 24, line 7; change "butadieneacrylonitrile" to ---butadiene-acrylonitrile---.

Column 25, line 24; change "Claim 3" to ---Claim 14---.

Signed and Sealed this

Seventeenth Day of May 1977

[SEAL]

Attest:

RUTH C. MASON
Attesting Officer

C. MARSHALL DANN
Commissioner of Patents and Trademarks